United States Patent [19]

Provanzano

[11] 3,789,244

[45] Jan. 29, 1974

[54] FET ANALOG MULTIPLEX SWITCH

[75] Inventor: Salvatore R. Provanzano, East Boston, Mass.

[73] Assignee: Spacetac Incorporated, Bedford, Mass.

[22] Filed: Sept. 8, 1972

[21] Appl. No.: 287,535

[52] U.S. Cl. .................. 307/251, 307/205, 307/304

[51] Int. Cl. .......................................... H03k 17/60

[58] Field of Search .... 307/205, 251, 279, 304, 255

[56] References Cited

UNITED STATES PATENTS

| | | | |
|---|---|---|---|
| 3,023,321 | 2/1962 | Isabeau | 307/317 |
| 3,089,963 | 5/1963 | Djorup | 307/255 |
| 3,488,520 | 1/1970 | Hunter | 307/304 |
| 3,533,087 | 10/1970 | Zuk | 307/279 |
| 3,569,737 | 3/1971 | Bauer | 307/251 |
| 3,521,141 | 7/1970 | Walton | 307/251 |
| 3,466,526 | 9/1969 | Cole | 307/251 |
| 3,631,528 | 12/1971 | Green | 307/251 |
| 3,189,758 | 6/1965 | Bell | 307/255 |
| 3,183,366 | 5/1965 | Brode | 307/255 |
| 3,584,236 | 6/1971 | Greatrea | 307/255 |

*Primary Examiner*—Rudolph V. Rolinec
*Assistant Examiner*—Ro E. Hart
*Attorney, Agent, or Firm*—Joseph S. Iandiorio

[57] ABSTRACT

An FET analog switching circuit, including an input terminal and an output terminal, first and second FET's connected together with their primary electrodes connected in series between the input terminal and the output terminal, one of the first and second FET's being an N type and the other being a P type, and means for selectively applying a switching signal of one polarity to the gate of the first FET to turn on the first FET and of the opposite polarity to the gate of the second FET to simultaneously turn on the second FET.

7 Claims, 4 Drawing Figures

FET ANALOG MULTIPLEX SWITCH

FIELD OF INVENTION

This invention relates to an FET switch, and more particularly to such a switch utilizing two complementary FET's.

BACKGROUND OF INVENTION

Conventional FET switches find application in multiplex systems for controlling connections of analog sensors to monitoring circuits. In the switched-off condition such circuits should provide a very high impedance so as not to excessively load the sensors whether the power to the switching circuit is on or off even if normal signals are applied to its input. This high impedance should be a factor even if a spurious overvoltage is provided at the input. One conventional such circuit uses an FET, a pair of diodes and a limiting resistor. With the power on and circuit switched off, the circuit responds with very high impedance to a normal input signal but a spurious over-voltage overcomes the back bias on one of the diodes (depending on the polarity of the over-voltage) and the impedance is reduced to that of the limiting resistor. With the circuit switched off and the power off, the back bias on the diodes is eliminated and so even a normal input signal can be conducted by one of the diodes and the impedance again is reduced to that of the limiting resistor. When the power is on and the circuit is switched on, the impedance can go no lower than that of the limiting resistor. Thus a compromise must be made in determining the value of the limiting resistance, between maximum desirable switch-on impedance and minimum allowable switch-off impedance. So while such a circuit gives moderate protection in most cases, in its closed state, it acts as a high impedance path which is not desirable. Another more complex and expensive conventional circuit uses transistors in combination with an FET but it presents a very high impedance path in all states and is very difficult to adjust for small signal operation because of inherent differences in the transistor junctions.

SUMMARY OF INVENTION

It is therefore an object of this invention to provide an inexpensive, simple and reliable switching circuit which presents high impedance to input signals when the circuit is switched-off and low impedance when the circuit is switched-on.

It is a further object of this invention to provide such a switching circuit which presents such an impedance pattern to input signals whether the circuit power is on or off and whether the signal at the input is in the normal range or is a substantial overvoltage and whatever the polarity of the input signal.

It is a further object of this invention to provide such a switching circuit which is a lower power drain when switched-off and a high conductance path when switched-on.

It is a further object of this invention to provide such a switching circuit which prevents possibility of signal cross-over between channels when used in a multiplexer system.

It is a further object of this invention to provide such a switching circuit which protects equally well against positive and negative voltage conditions.

This invention features an FET analog switching circuit including an input terminal and an output terminal and first and second FET's connected together with their primary electrodes connected in series between the input and output terminals. One of the first and second FET's is an N type and the other is a P type. There are means for selectively applying a switching signal of one polarity to the gate of the first FET to turn on the first FET and of the opposite polarity to the gate of the second FET to simultaneously turn on the second FET.

DISCLOSURE OF PREFERRED EMBODIMENT

Other objects, features and advantages will occur from the following description of a preferred embodiment and the accompanying drawings, in which.

Figure 1:
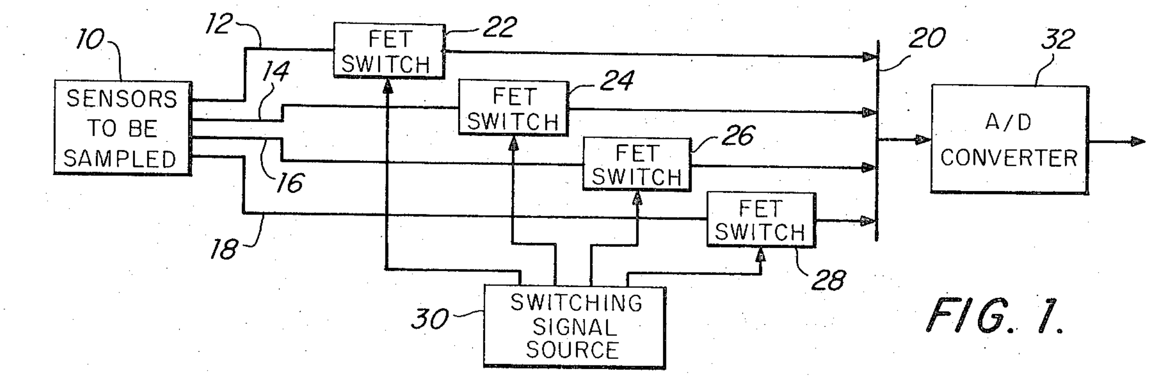
FIG. 1 is a block diagram of a typical multiplexer system in which the FET analog switching circuit of this invention may be utilized.

A typical multiplex system in which the FET analog switching circuit of this invention may be used is shown in FIG. 1 as including a group of sensors to be sampled 10 whose analog outputs are provided on lines 12, 14, 16 and 18 to a common bus 20 through FET analog switching circuits 22, 24, 26, and 28. Switching signal source 30 provides signals that actuate FET analog switching circuits 22, 24, 26 and 28 in some predetermined pattern so that the analog output from sensors to be sampled 10 are provided one at a time on bus 20 to be converted to digital signals by analog/digital (A/D) converter 32.

Figure 2:
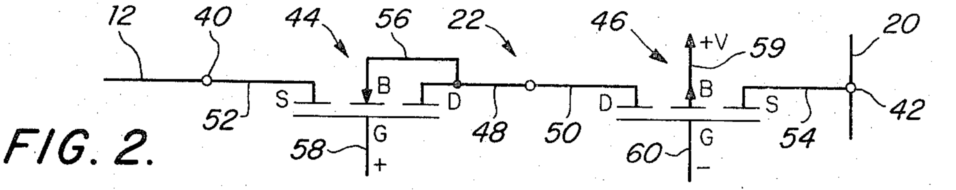
FIG. 2 is a schematic diagram of an FET analog switching circuit according to this invention.

An FET analog switching circuit according to this invention is shown in more detail in FIG. 2 with specific reference to circuit 22, FIG. 1. FET analog switching circuit 22 includes an input terminal 40 connected to the output line 12 of one of the sensors to be sampled 10 and an output terminal 42 connected to the common bus 20 that is the input to A/D converter 32, FIG. 1. Connected between input terminal 40 and output terminal 42 are a pair of complementary FET's 44 and 46 with their primary electrodes connected in series. The drain electrode 48 of FET 44 is connected to the drain electrode 50 of FET 46. The source electrode 52 of FET 44 is connected to input terminal 40 and the source electrode 54 of FET 46 is connected to output terminal 42. FET 44 is an N type FET and has its body electrodes 56 connected to its own drain electrode 48. FET 46 is a P type FET and has its body electrode connected to a source of voltage +V. Voltage V is defined as that magnitude required to switch each of FET's 44 and 46. FET 44 being an N type requires a $+V$ switching signal on its gate electrode 58 whereas FET 46 being a P type requires a $-V$ switching signal on its gate electrode 60. Although in FIG. 2, as illustrated, the N type FET 44 has its source connected to terminal 40 and the P type FET 46 has its source electrode 54 connected to the output terminal 42, that arrangement is not a limitation of this invention as the connection may be reversed i.e., source electrode 54 of FET 46 may be connected to input terminal 40 and source electrode 52 of FET 44 may be connected to the output terminal 42. In that instance, the base electrode 59 of FET 46 is connected to its drain electrode 50 and the base electrode 56 of FET 44 is connected to $-V$ as explained further with reference to FIG. 3. FET 44 is an M117 MOSFET and FET 46 is an IT1700 MOSFET. MOSFET's are preferred over the JFET's because they present a higher impedance with the power off. Each of these FET's has an on or closed impedance of approximately 250 ohms and an off or open impedance of approximately 100 megohms. When gate electrode 58 of FET 44 receives a $+V$ switching signal and simultaneously gate electrode 60 of FET 46 receives a $-V$ switching signal, both of the FET's will be turned on. The impedance between input terminal 40 and output terminal 42 will be reduced to approximately 500 ohms whereupon the signal on line 12 will be passed to output terminal 42 and bus 20. However, if either the negative signal on gate electrode 60 or the positive signal on gate electrode 58 or both of them are missing, the signal will not pass into output terminal 42 and the impedance seen by the one of the sensors 10 connected to line 12 will be approximately 100 megohms.

Figure 3:
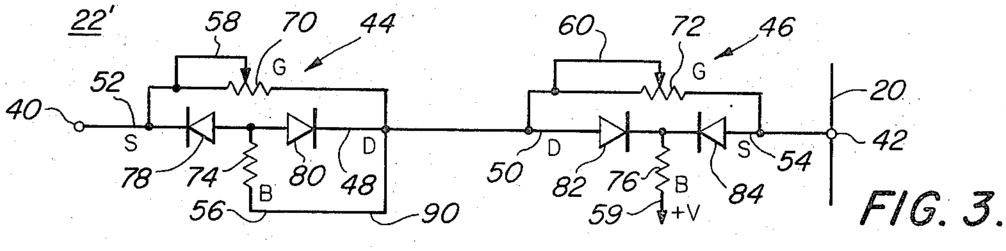
FIG. 3 is an equivalent circuit of the circuit of FIG. 2.

The added protection provided by the FET analog switching circuit of this invention may be better understood with reference to the equivalent circuit 22, FIG. 3, of FET switching circuit 22, described in FIG. 2.

In the equivalent circuit, FIG. 3, like parts have been give like numbers with reference to FIG. 2. Resistors 70 and 72 represent the source to drain impedance of FET's 44 and 46, respectively, or approximately 100 megohms. Diode 78 represents the source to body junction and diode 80 the body to drain junction in FET 44. Diode 82 represents the drain to body junction and diode 84 represents the body to source junction in FET 46.

It is best to connect base electrodes 56 and 59 to some stable voltage level in order to prevent cross-talk between neighboring channels in a multiplex system and to prevent introduction of other spurious signals into the system.

Preferably, as shown in FIG. 3, base 56 is connected by line 90 to drain 48 of FET 44 and base 59 of FET 46 is connected to $+V$. The connection of base 56 to drain 48, is preferred because with this arrangement a positive voltage appearing at input terminal 40 is arrested by diode 78 and a negative voltage present at terminal 40, passes through diode 78 and circumvents diode 80 by means of line 90; but that negative voltage appearing at drain electrode 50 of FET 46 is blocked by diode 82 and in fact acts as a reverse bias to further turn off FET 46 because it is a P type FET which requires that the primary circuit i.e. the drain source circuit be positive not negative with respect to the gate electrode 60. Were the other option taken, i.e., line 90 connected from base electrode 56 to source electrode 52, a negative voltage appearing at input terminal 40 would pass through diode 78 but be blocked by diode 80. But a positive voltage appearing at input terminal 40 would be shunted around diode 78 by line 90 so connected and would then pass through diode 80 to appear at drain electrode 50 of FET 46. This positive voltage on the drain electrode 50 of P type FET 46 would turn on that FET, and destroy the effectiveness of the circuit. Thus line 90 is connected from base electrode 56 to drain electrode 48. Base electrode 59 is connected to a +V voltage level. If it were connected instead to drain electrode 50 of FET 46, a negative voltage appearing at the terminal 40 could be passed through diode 78, shunted around diode 80 by line 90, then shunted around a connection from drain electrode 50 to body 59 and then through diode 84 to defeat the protection offered by the circuit. In contrast, if base electrode 59 were connected to source electrode 54, a further problem arises.

Namely, when the FET analog switching circuit 22 whose equivalent circuit, 22, FIG. 3, is used in conjunction with one or more additional identical circuits 24, 26 and 28 as shown in FIG. 1, a problematic condition can arise when any one of FET analog switching circuits 22, 24, 26 and 28 is switched on. For example, if FET analog switching circuit 22 is turned on, the input on line 12 is provided to bus 20. Any other signal appearing on line 20 also appears at the output terminal of each of the other of the FET switching circuit in the system. Referring again to FIG. 3, and assuming that there is a negative voltage appearing on bus 20, that negative voltage could be shunted about diode 84, if as was previously assumed body electrode 58 was connected to source electrode 54. That negative voltage then passes through diode 82 and appears at the drain electrode 48 of FET 44. With this condition the drain-source circuit of FET 44 is negative with respect to its gate electrode 58. Thus FET 44 is turned on and a circuit is completed from bus 20 backwards through FET 46 and FET 44 to input terminal 40, whereupon the output signal from one sensor has been fed back to another sensor, a situation which must be avoided at all times. Thus to prevent this unique combination of events from occurring and permitting shorting of one sensor to another, the base electrode 59 has been connected to a $+V$ voltage source. A voltage of $+V$ applied to base electrode 59, back biases diode 84 so that any signal appearing on common bus 20 must exceed the value of $+V$ before it can be conducted through diode 84. This eliminates problems from negative voltages which appear on common bus 20 and positive voltages below the level of $+V$. And since $+V$ is the voltage required on gate electrode 58 of FET 44 to switch FET 44 to the conducting state, it is apparent that the system must be designed so that there is never presented at input terminal 40 a voltage which is greater than $+V$: since input terminal 40 is connected to source electrode 52 such a voltage would back bias FET 44 and the system would never work. Therefore, there will never appear on common bus 20 a signal from a sensor which exceeds $+V$ and so there will never be a signal on common bus 20 which can overcome the back bias of $+V$ which is applied to diode 84.

If it is desired to provide the P type FET 46 with its source electrode connected to input terminal 40 and the N type FET 44 with its source electrode connected to output terminal 42 then the base electrode 59 of FET 46 is connected to its drain electrode 50 and the base electrode 56 of FET 44 is connected to $-V$.

Figure 4:
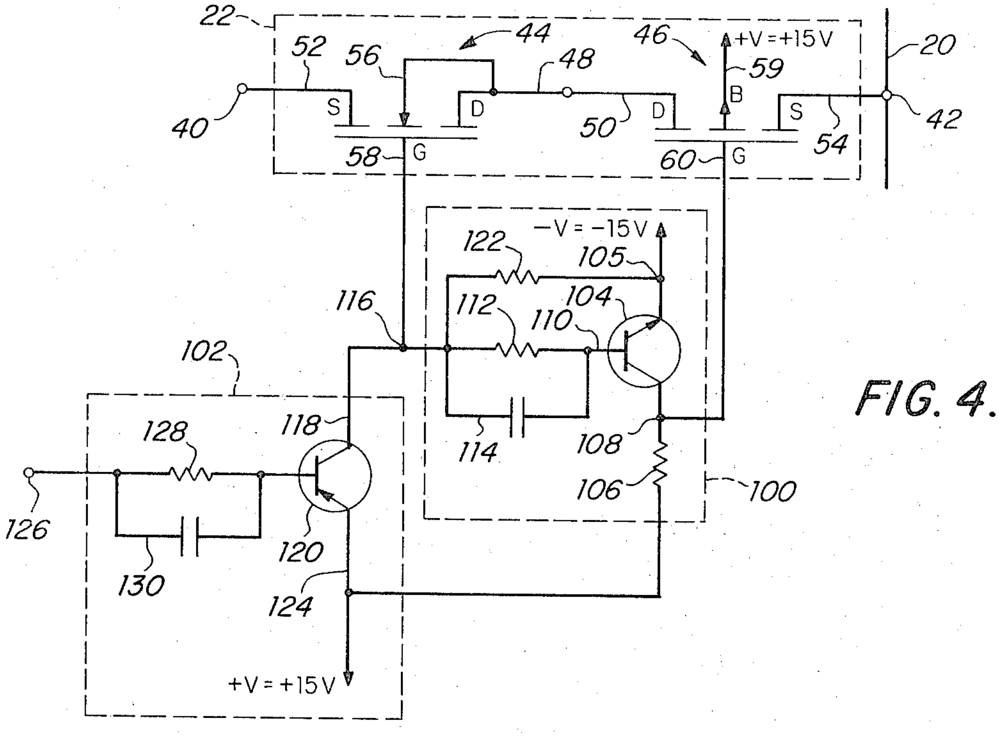
FIG. 4 is a schematic diagram of an FET analog switching system according to this invention with an inverter circuit and reverse bias circuit which may be combined with it in preferred embodiments.

The simultaneous switching signals of opposite polarity which must be applied to FET's 44 and 46 to open switching circuit 22 may be provided by an inverter circuit 100, FIG. 4, wherein like parts have been given like numbers with reference to FIGS. 1, 2 and 3. Also shown in FIG. 4, is a reverse biasing circuit 102 which maintains the gate electrodes 58 and 60 of FET's 44 and 46 at a voltage equal and opposite to the voltage required to switch them on in order to further safeguard the circuit against spurious signals.

Inverter 100 includes a transistor 104 having its emitter 105 connected to a source of $-V$ voltage and its collector connected through an isolation resistor 106 to a source of $+V$ voltage. Resistor 106 is approximately 8.2 kilohms and is provided to prevent the $-V$ voltage source from shorting to the $+V$ voltage source when transistor 104 is conducting. Transistor 104 may be an NPN transistor odemtified as a 2N2222. In this circuit where $V$ is equal to 15 and the relevant voltages therefore are equal to −15 volts and +15 volts, it is important that transistor 104 have a 30 volt emitter to collector breakdown voltage rating. The gate electrode 60 of FET 46 is connected to the collector electrode 108 of transistor 104. The base 110 of transistor 104 is connected to resistor 112 in parallel with a 10 pf capacitor 114 which operates to compensate for the internal capacitance of transistor 104 and thereby reduce the switching time of the circuit. The other ends of capacitor 114, and resistor 112, are connected to the gate electrode 58 of FET 44 at junction 116 which is also interconnected with the collector 118 of transistor 120 in reverse biasing circuit 102. Collector 118 is connected through isolating resistor 122 to the source of $-V$ voltage. Transistor 120 is a PNP transistor identified as a 2N3251 and should also have an emitter-collector breakdown rating of 30 volts. Isolation resistor 122 is an 8.2 kilohm resistor. The emitter 124 of transistor 120 is connected to a source of $+V$ voltage and its base is connected to control terminal 126 through the parallel combination of base bias resistor 128 and capacitor 130. Resistor 128 and capacitor 130 have the same values and perform the same function as resistor 112, capcitor 114, respectively.

In operation with the power on and no switching signal present at control terminal 126, there is present +15 volts on base electrode 59 and +15 volts at emitter 124 of transistor 120. There is also provided −15 volts at emitter 105 of transistor 104. The −15 volts present at emitter also appears at junction 116 and back biases gate electrode 58 which in this instance requires an increase of 30 volts to +15 volts to switch on FET 44. Resistor 122 prevents the shorting of the +15 volt source to the −15 volt source when transistor 120 conducts. The +15 volts present at emitter 124 appears at junction 108 and back biases gate electrode 60 to +15 volts which is actually a back bias of 30 volts since FET 46 requires a −15 volts on gate electrode to be switched on. Isolation resistor 106 prevents shorting of the +15 volt power supply to the −15 voltpower supply when transistor 104 conducts. Circuit 22 may now be switched on by a signal supplied to control terminal 126 which turns on transistor 120 driving junction 116 from −15 volts to a +15 volts and simultaneously turns on transistor 104 which drives emitter 108 from +15 volts to −15 volts, thereby turning on both FET's 44 and 46. Upon removal of the switching input on control terminal 126, reverse bias circuit 102 immediately returns to its off state, causing inverter 100 to do the same, whereby FET's 44 and 46 are turned off and the FET analog switching circuit 22 is opened.

Other embodiments will occur to those skilled in the art and are within the following claims:

What is claimed is:

1. An FET analog switching circuit comprising an input terminal and an output terminal, first and second FET's connected together with their primary electrodes connected in series between said input terminal and said output terminal one of said first and second FET's being an N type, and the other being a P type; one of said FET's being arranged with its source electrode connected to said input terminal and its drain electrode connected to the drain electrode of the other FET, the other FET having its source electrode connected to said output terminal, the one of said FET's connected to said input terminal also having its body electrode connected to its drain electrode and the FET connected to said output terminal also having its body electrode connected to a source of voltage of the same polarity as and equal to or greater than the amplitude of the voltage presented to the FET connected to said input terminal; and means for selectively applying a switching signal of one polarity to the gate of the first FET to turn on said first FET and of the opposite polarity to the gate of said second FET to simultaneously turn on said second FET.

2. The circuit of claim 1 in which said means for selectively applying includes an inverter with its output connected to one of said FET's and its input connected to the other of said FET's and to a control terminal adapted to receive a switching input.

3. The circuit of claim 1 further including a reverse biasing circuit for maintaining a substantial reverse bias of one polarity on one of said first and second FET's and of the opposite polarity on the other of said FET's in their off states to prevent accidental switching of each of said FET's.

4. The circuit of claim 1 in which the N type one of said FET's has its source connected to said input terminal and the P type has its source connected to said output terminal.

5. The circuit of claim 1 in which said P type one of said FET's has its source connected to said input terminal and said N type has its source connected to said output terminal.

6. An FET analog switching circuit comprising an input terminal and an output terminal, first and second FET's connected together with their primary electrodes connected in series between said input terminal and said output terminal, one of said first and second FET's being an N type, and the other being a P type; said N type one of said FET's having its body electrode connected to its drain electrode and said P type one of said FET's having its body electrode connected to a positive voltage level approximately equal to or greater than the voltage level of the switching signal applied to the gate electrode of the N type one of said FET's, and means for selectively applying a switching signal of one polarity to the gate of the first FET to turn on said first FET and of the opposite polarity to the gate of said second FET to simultaneously turn on said second FET.

7. An FET analog switching circuit comprising an input terminal and an output terminal, first and second FET's connected together with their primary electrodes connected in series between said input terminal and said output terminal, one of said first and second FET's being an N type, and the other being a P type; said P type one of said FET's having its body electrode connected to its drain electrode and said N type one of said FET's having its body electrode connected to a negative voltage level approximately equal to or greater than the voltage level of the switching signal applied to the gate electrode of the P type one of said FET's and means for selectively applying a switching signal of one polarity to the gate of the first FET to turn on said first FET and of the opposite polarity to the gate of said second FET to simultaneously turn on said second FET.

* * * * *